US009998640B2

(12) United States Patent
Ohara

(10) Patent No.: US 9,998,640 B2
(45) Date of Patent: Jun. 12, 2018

(54) CAMERA MODULE INCLUDING VENTILATION GROOVE AND RECESS PORTION

(71) Applicant: Sharp Kabushiki Kaisha, Sakai, Osaka (JP)

(72) Inventor: Yoshikazu Ohara, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days. days.

(21) Appl. No.: 15/304,108

(22) PCT Filed: Mar. 27, 2015

(86) PCT No.: PCT/JP2015/059745
§ 371 (c)(1),
(2) Date: Oct. 14, 2016

(87) PCT Pub. No.: WO2015/159689
PCT Pub. Date: Oct. 22, 2015

(65) Prior Publication Data
US 2017/0041515 A1 Feb. 9, 2017

(30) Foreign Application Priority Data
Apr. 18, 2014 (JP) ................................. 2014-086797

(51) Int. Cl.
H04N 5/225 (2006.01)
G02B 7/02 (2006.01)
(Continued)

(52) U.S. Cl.
CPC ........... H04N 5/2252 (2013.01); G02B 7/021 (2013.01); G02B 7/025 (2013.01); G02B 13/16 (2013.01);
(Continued)

(58) Field of Classification Search
CPC ..... H01L 27/14618; H01L 2224/73265; H01L 2224/48091; H01L 2924/00014; H04N 5/2251; H04N 5/2257; H04N 5/2252
See application file for complete search history.

(56) References Cited

U.S. PATENT DOCUMENTS

2005/0247992 A1 11/2005 Tsukamoto et al.
2008/0122967 A1* 5/2008 Huang ..................... G02B 7/08
348/340

(Continued)

FOREIGN PATENT DOCUMENTS

JP 2005-322809 A 11/2005
JP 2008-300698 A 12/2008
(Continued)

OTHER PUBLICATIONS

Official Communication issued in International Patent Application No. PCT/JP2015/059745, dated Jun. 16, 2015.

Primary Examiner — Sinh Tran
Assistant Examiner — Selam Gebriel
(74) Attorney, Agent, or Firm — Keating & Bennett, LLP

(57) ABSTRACT

Provided is a camera module capable of securing air permeability in an imaging portion of the camera module and reducing failure (speck failure) of an image sensor, which is caused by adhesion of a foreign matter. In a camera module in which an internal space is formed by a wiring substrate, a cover body (36), and a transparent plate (38), a ventilation groove (45) which extends from the internal space to an outside of the internal space and a recess part (46) which is formed so as to branch off from the ventilation groove (45) are formed on a surface of the cover body (36), which adheres to the transparent plate (38).

9 Claims, 15 Drawing Sheets

(51) Int. Cl.
*G02B 13/16* (2006.01)
*G02B 27/00* (2006.01)

(52) U.S. Cl.
CPC ......... *G02B 27/0006* (2013.01); *H04N 5/225* (2013.01); *H04N 5/2253* (2013.01); *H04N 5/2254* (2013.01); *H04N 5/2257* (2013.01)

(56) References Cited

U.S. PATENT DOCUMENTS

| | | |
|---|---|---|
| 2008/0296715 A1 | 12/2008 | Kumata et al. |
| 2010/0149410 A1* | 6/2010 | Matsuzawa ............ H01L 23/10 348/374 |
| 2015/0172519 A1 | 6/2015 | Mitarai et al. |
| 2016/0116701 A1* | 4/2016 | Yamada ............ H01L 27/14618 348/374 |
| 2017/0180613 A1* | 6/2017 | Dobashi ............... H04N 5/2254 |

FOREIGN PATENT DOCUMENTS

| | | |
|---|---|---|
| JP | 2013-192207 | 9/2013 |
| JP | 5341266 B2 | 11/2013 |

* cited by examiner

CAMERA MODULE INCLUDING VENTILATION GROOVE AND RECESS PORTION

TECHNICAL FIELD

The present invention relates to a camera module.

BACKGROUND ART

A camera module which is used for a cellular phone with a camera, a digital camera, a security camera, or the like has a structure in which, for example, an image sensor such as a CCD (Charge Coupled Device) and a CMOS (Complementary Metal Oxide Semiconductor), a transparent plate such as glass, a wiring substrate having terminals, a cover body holding the above, a concentrating portion including lenses, a lens barrel, and the like, and a lens holder holding the lenses and the barrel are integrated.

FIGS. 15(a) to (e) illustrate a structure of a camera module of PTL 1. As illustrated in FIG. 15(a), the camera module includes a concentrating portion 20 and an imaging portion 10. The concentrating portion 20 is provided with a lens holder 22 and a lens unit which is fixed to the lens holder 22 and includes a lens 21. The imaging portion 10 is provided with a wiring substrate 11, an image sensor 13 which is mounted on the wiring substrate 11 via an adhesive 12, a transparent plate 17 made of glass, plastics, or the like, and a cover body 14 which covers the wiring substrate 11 and the image sensor. The cover body 14 is mounted on the wiring substrate 11. The image sensor 13 is electrically connected to the wiring substrate 11 with wires 15 or the like. Peripheral part of the transparent plate 17 is fixed to the cover body 14 with an adhesive 16. The lens unit is provided above the image sensor 13 and the transparent plate 17 which are in the imaging portion 10.

An aperture is provided in the center of the cover body 14, and the transparent plate 17 is arranged on the aperture. As a result, an internal space 18 surrounded by the transparent plate 17, the cover body 14, and the wiring substrate 11 is formed in the imaging portion 10.

In a case where the internal space 18 is sealed up, there is a possibility that a gas in the internal space 18 thermally expands in accordance with an increase in temperature and then a crack and the like occurs at a joining part serving as a starting point. Moreover, there is also a possibility that the transparent plate 17 loses transparency due to an influence of a gas or ions which are generated from the adhesive 12, 16, and the like because of a change in temperature or pressure. In the camera module, by providing a ventilation groove G in the cover body 14, the internal space 18 and an outside of the cover body 14 are made to communicate with each other via the ventilation groove G and a gap 19. Note that, a structure of the ventilation groove G is as illustrated in plan view in FIGS. 15(b) to (e).

In this case, when the internal space 18 and the outside of the cover body 14 are made to communicate with each other as described above, there is a possibility that a foreign matter enters the internal space 18 from the outside and the foreign matter adheres to the image sensor 13. In the camera module, a recess part GH is formed by partially digging a bottom of the ventilation groove G deeply as illustrated in FIG. 15(e), and the foreign matter which has entered into the ventilation groove G is trapped by the recess part GH.

CITATION LIST

Patent Literature

PTL 1: Japanese Patent No. 5341266 (published on Sep. 26, 2013)

SUMMARY OF INVENTION

Technical Problem

However, there is also a possibility that the foreign matter trapped by the recess part GH easily returns to the ventilation groove G because of switching of the top and bottom of the camera module or the like and adheres onto the image sensor 13. Note that, there is also a situation that it is difficult to make the cover body 14 thick in the camera module for which thinning is demanded and it is difficult to make the recess part GH deep enough for the trap.

An object of the invention is to provide a camera module capable of securing air permeability in an imaging portion of the camera module and reducing failure (speck failure) of an image sensor, which is caused by adhesion of a foreign matter.

Solution to Problem

The present camera module has a configuration in which, a camera module includes a wiring substrate, an image sensor mounted on the wiring substrate, a cover body covering the image sensor, a transparent plate adhering to the cover body so as to overlap with an aperture of the cover body which is formed above the image sensor, and an imaging lens provided above the transparent plate, in which an internal space is formed by the wiring substrate, the cover body, and the transparent plate. In the camera module, a ventilation groove which extends from the internal space to an outside of the internal space and a recess part which is formed so as to branch off from the ventilation groove are formed on a surface of the cover body, which adheres to the transparent plate.

In the aforementioned configuration, since the recess part is formed so as to branch off from the ventilation groove, it is difficult for a foreign matter which has intruded into the ventilation groove and has been trapped by the recess part to return to the ventilation groove. Thereby, it is possible to suppress intrusion of the foreign matter into the internal space.

Advantageous Effects of Invention

As above, it is possible to secure air permeability in an imaging portion of a camera module and reduce failure (speck failure) of an image sensor, which is caused by adhesion of a foreign matter.

DESCRIPTION OF EMBODIMENTS

Embodiment 1

Embodiments of the invention will be described based on FIG. 1 to FIG. 14 as follows.

(Basic Configuration of Camera Module)

Figure 1:
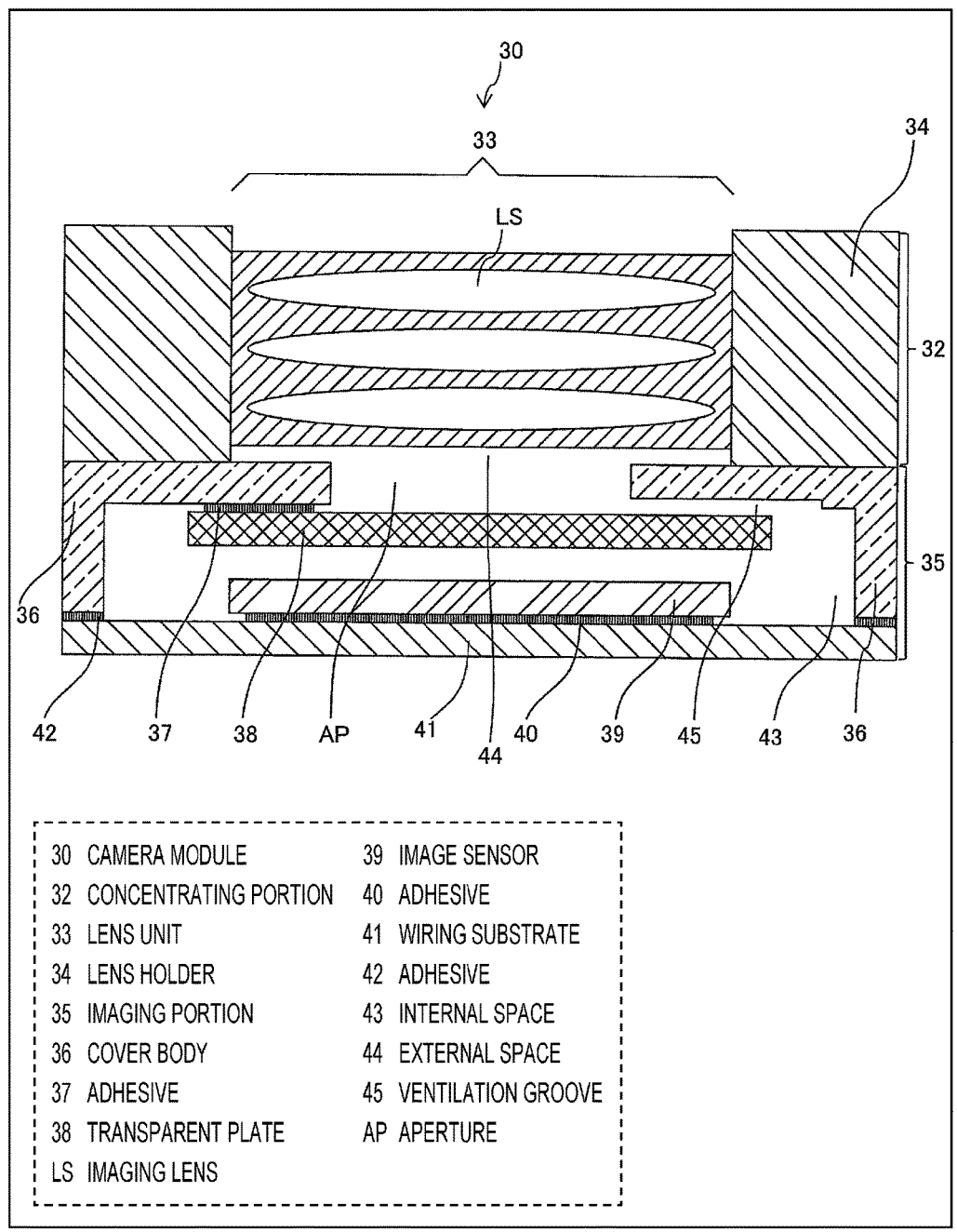
FIG. 1 is a sectional view schematically illustrating a configuration of a camera module according to Embodiment 1.

FIG. 1 is a sectional view schematically illustrating a configuration of a camera module according to Embodiment 1. As illustrated in FIG. 1, a camera module 30 includes a concentrating portion 32 and an imaging portion 35. The concentrating portion 32 is provided with a lens holder 34 and a lens unit 33 which is fixed to the lens holder 34 and includes imaging lenses LS.

The imaging portion 35 includes a wiring substrate 41, an image sensor 39 which is mounted on the wiring substrate 41 via an adhesive 40, and a cover body 36 which covers the wiring substrate 41 and the image sensor 39. The cover body 36 is fixed to the wiring substrate 41 via an adhesive 42, and the image sensor 39 is electrically connected to the wiring substrate 41 with a wire (not illustrated) or the like.

An aperture AP is provided in the center of a ceiling part of the cover body 36, and a transparent plate 38 is provided so as to overlap with the aperture AP. The transparent plate 38 is positioned above the image sensor 39 and fixed to a circumference of the aperture AP in the ceiling part with an adhesive 37. Accordingly, an internal space 43 surrounded by the wiring substrate 41, the cover body 36, and the transparent plate 38 is formed in the imaging portion 35. The transparent plate 38 is fixed to a lower surface of the ceiling part of the cover body 36 in FIG. 1, but, without limitation thereto, may be fixed to an upper surface of the ceiling part. The transparent plate 38 is formed of a transparent material such as glass, plastics, or others. The lens unit 33 is provided on an upper surface side of the ceiling part of the cover body 36, and positioned above the image sensor 39 and the transparent plate 38.

The concentrating portion 32 of FIG. 1 has the simplest configuration of a fixed focus system, which is constituted by the lens unit 33 and the lens holder 34, but, needless to say, there is no limitation thereto. The concentrating portion 32 may be provided with a lens driving device of an autofocus mechanism, a zoom mechanism, an image stabilizing mechanism, a macro photographing mechanism, or the like.

(Ventilation Groove of Camera Module)

Figure 2:
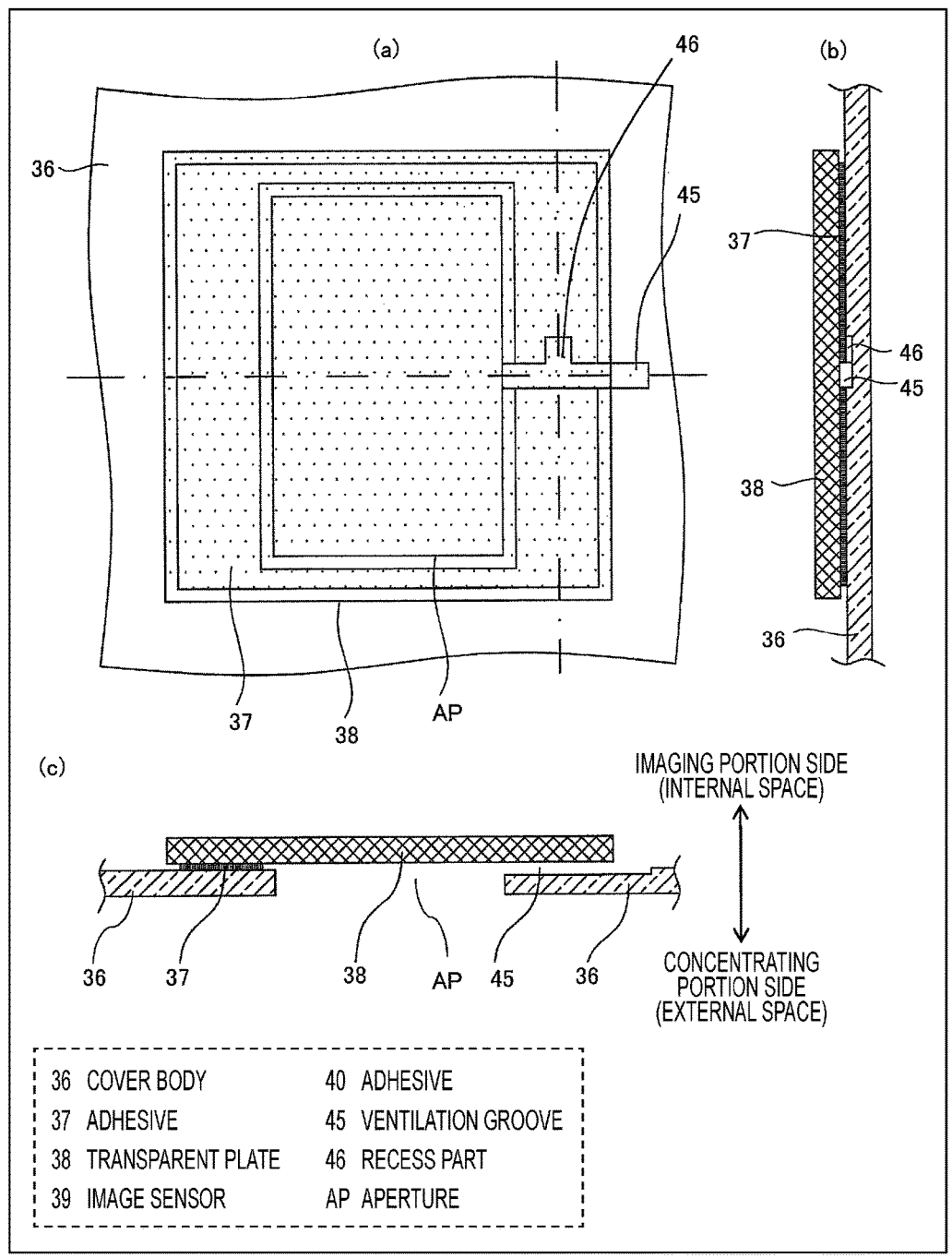
FIG. 2(a) is a lower surface view of an imaging portion of FIG. 1, (b) is a sectional view taken along a vertical line of (a), and (c) is a sectional view taken along a horizontal line of (a).
Figure 3:
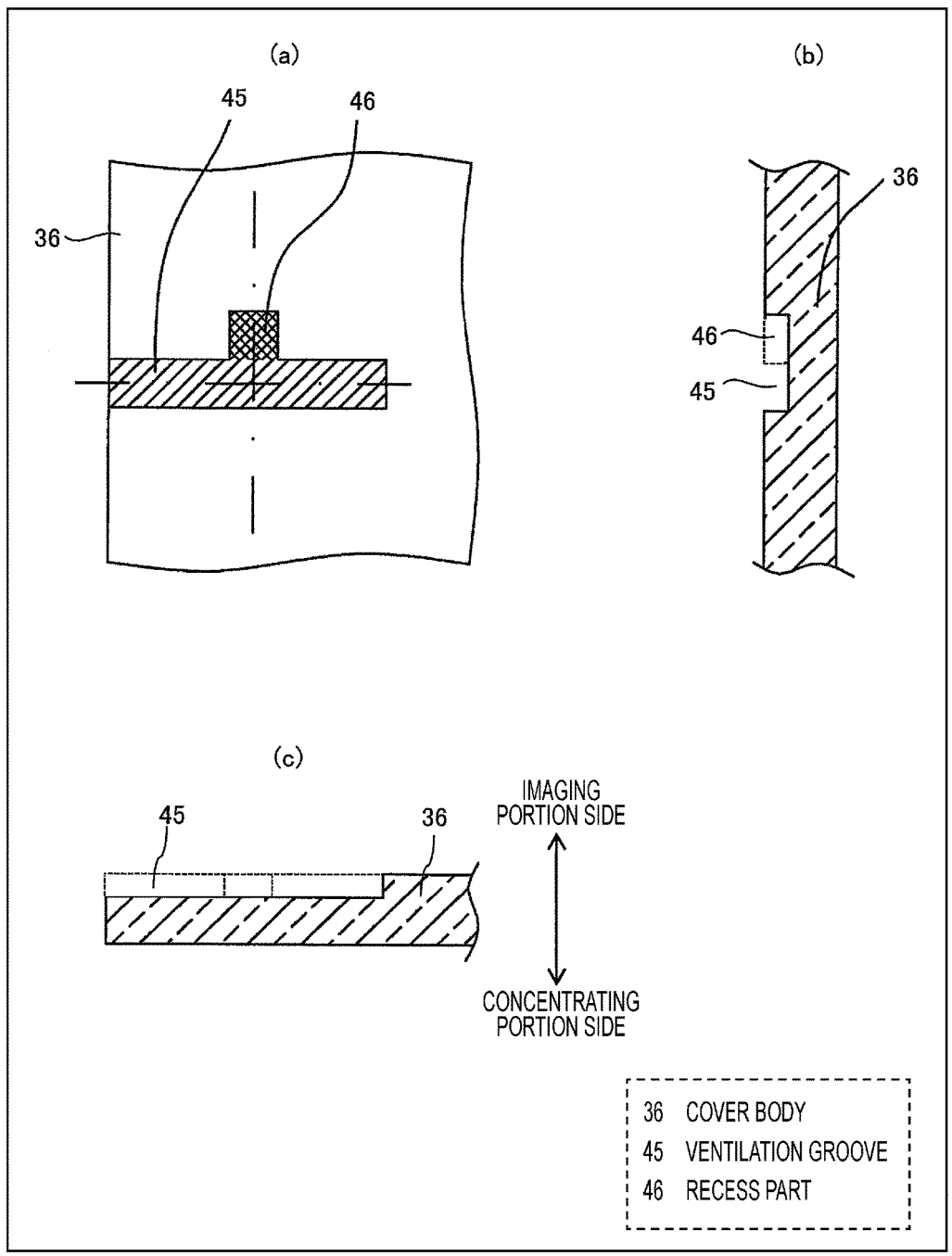
FIG. 3(a) is a plan view illustrating a configuration of a cover body of Embodiment 1, (b) is a sectional view taken along a vertical line of (*a*), and (*c*) is a sectional view taken along a horizontal line of (*a*).

FIG. 2(*a*) is a rear surface view of a part of the imaging portion illustrated in FIG. 1, (*b*) is a sectional view taken along a vertical line of (*a*), and (*c*) is a sectional view taken along a horizontal line of (*a*). FIG. 3(*a*) is a plan view illustrating a configuration of the cover body of FIGS. 1 and 2, (*b*) is a sectional view taken along a vertical line of (*a*), and (*c*) is a sectional view taken along a horizontal line of (*a*).

As illustrated in FIG. 1 to FIG. 3, in the camera module 30, a ventilation groove 45 which extends from the internal space 43 to an outside of the internal space (external space 44) and a recess part 46 which is formed so as to branch off from the ventilation groove 45 are provided on a surface in the ceiling part of the cover body 36, which adheres to the transparent plate 38. That is, the internal space 43 and the external space 44 communicate with each other via the ventilation groove 45, and the recess part 46 which communicates with the ventilation groove 45 is provided so that an opening area of the ventilation groove 45 with respect to the transparent plate 38 becomes large.

More specifically, the ventilation groove 45 which goes to the outside from the aperture AP in the center and the recess part 46 which communicates with the ventilation groove 45 are provided on the lower surface of the ceiling part of the cover body 36, and the transparent plate 38 is adhered, via the adhesive 37, to a region surrounding the aperture AP except for a region corresponding to the ventilation groove 45 and the recess part 46. As a result, in a state where the transparent plate 38 is fixed to the cover body 36, the internal space 43 communicates with an outside of the cover body 36 (external space 44) via the ventilation groove 45.

Here, the concentrating portion 32 having the lens unit 33 is provided above the ceiling part of the cover body 36, and the concentrating portion 32 is not sealed but communicates with an outside of the camera module 30, that is, open air at a minute void. Accordingly, it can be said that communication between the internal space 43 and the external space 44 is equivalent to communication between the internal space 43 and the outside of the camera module 30, that is, the open air. Thus, it is possible to release a gas or ions generated from the adhesive 37, 40, or 42 or the like in the internal space 43 of the imaging portion 35 to the open air via the ventilation groove 45, and suppress fogging of the transparent plate 38. In addition, it is possible to suppress an increase in pressure inside the internal space, which is caused by thermal expansion of a gas, and prevent breakage or the like in the camera module.

Since the recess part 46 communicates with the ventilation groove 45, it is possible to easily trap a foreign matter, which has intruded into the ventilation groove 45, by the recess part 46. The recess part 46 is formed so as to branch off from the ventilation groove 45, so that it is difficult for the foreign matter which has been trapped once to return to the ventilation groove 45 even when the top and bottom or a posture of the camera module is changed. Accordingly, there is little chance of the foreign matter, which has intruded into the ventilation groove 45 from the outside of the camera module 30 via the concentrating portion 32, reaching the internal space 43. Note that, at least one ventilation groove 45 needs to be formed, and two or more ventilation grooves may be formed.

The ventilation groove 45 is deep enough to suitably let in the adhesive 37 which is spread by pressing when the transparent plate 38 is fixed to the cover body 36, and clogging of the ventilation groove 45 due to the adhesive 37 is thereby avoided. That is, the adhesive 37 is applied only as far as the front of the ventilation groove 45.

Here, in a case where the depth of the ventilation groove 45 is set without taking the clogging of the adhesive 37 into consideration, a minimum value (for example, 0.01 to 0.1 mm) with which both of two objects of discharging a gas existing in the internal space 43 and preventing a foreign matter from intruding from the outside are achieved is ideal. However, in the case of taking the clogging of the adhesive 37 flowing in the ventilation groove 45 into consideration, the depth of about 0.015 mm to 0.040 mm is suitable, for example. At this time, as to a length and a width of the ventilation groove 45, it is preferable to set the length to be, for example, 0.2 to 1.0 mm and the width to be, for example, 0.1 mm to 0.5 mm.

The recess part 46 is not limited to have a linear shape, and may have an arc shape, an S-shape, or a curved shape. Note that, when a range of the recess part 46 is larger, ability of trapping a foreign matter is improved.

Embodiment 2

Figure 4:
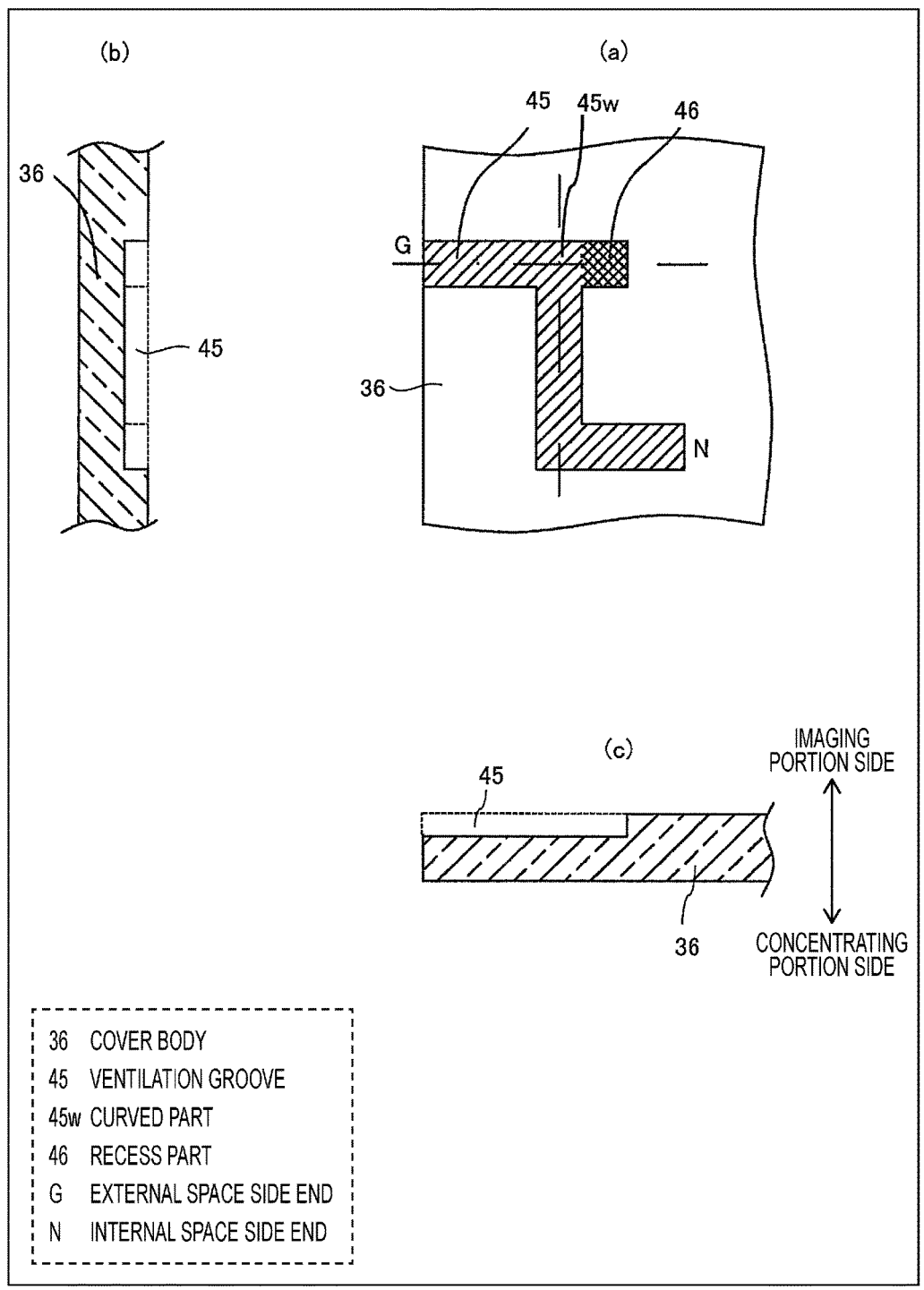
FIG. 4(*a*) is a plan view illustrating a configuration of a cover body of Embodiment 2, (*b*) is a sectional view taken along a vertical line of (*a*), and (*c*) is a sectional view taken along a horizontal line of (*a*).

FIG. 4(*a*) is a plan view illustrating a configuration of a cover body of Embodiment 2, (*b*) is a sectional view taken along a vertical line of (*a*), and (*c*) is a sectional view taken along a horizontal line of (*a*). As illustrated in FIGS. 1 and 4, the ventilation groove 45 and the recess part 46 which is formed so as to branch off from the ventilation groove 45 are provided on the surface in the ceiling part of the cover body 36, which adheres to the transparent plate 38, the ventilation groove 45 has a curved part 45*w*, and the recess part 46 communicates with the curved part 45*w* in such a manner that a path from an external side end (external space side end) G of the ventilation groove 45 to the curved part 45*w* is extended.

In Embodiment 2, a foreign matter which has intruded from the external side end G of the ventilation groove 45 goes straight ahead without turning at the curved part 45*w* and is easily trapped by the recess part 46, and it is difficult for the foreign matter which has been trapped by the recess part 46 once to return to the ventilation groove 45 even when the top and bottom or the posture of the camera module is changed. Thus, it becomes difficult for the foreign matter to reach an internal space side end N of the ventilation groove 45.

On the other hand, a foreign matter which has intruded into the internal space side end N of the ventilation groove 45 from the internal space 43 goes over the curved part 45*w* of the ventilation groove 45, and reaches between the curved part 45*w* and the external side end G or the recess part 46. The foreign matter which has reached between the curved part 45*w* and the external side end G is discharged to the external space 44 by an air current which is generated due to expansion of a gas in the internal space 43, when a temperature of the internal space 43 rises. Moreover, when the temperature of the internal space 43 drops, the foreign matter which exists between the curved part 45*w* and the external side end G is captured by the recess part 46 by an air current generated due to shrinkage of the gas in the internal space 43.

That is, since a difference is caused in a passing rate of a foreign matter according to a direction in which the foreign matter intrudes into the ventilation groove 45 (it is easy for the foreign matter from the internal space 43 to pass through the ventilation groove 45 and to be discharged to the external space 44, and, as being captured by the recess part 46, it is difficult for the foreign matter from the external space 44 to pass through the ventilation groove 45), it becomes possible to reduce adhesion of the foreign matter to the image sensor 39 (failure of the camera module).

Embodiment 3

Figure 5:
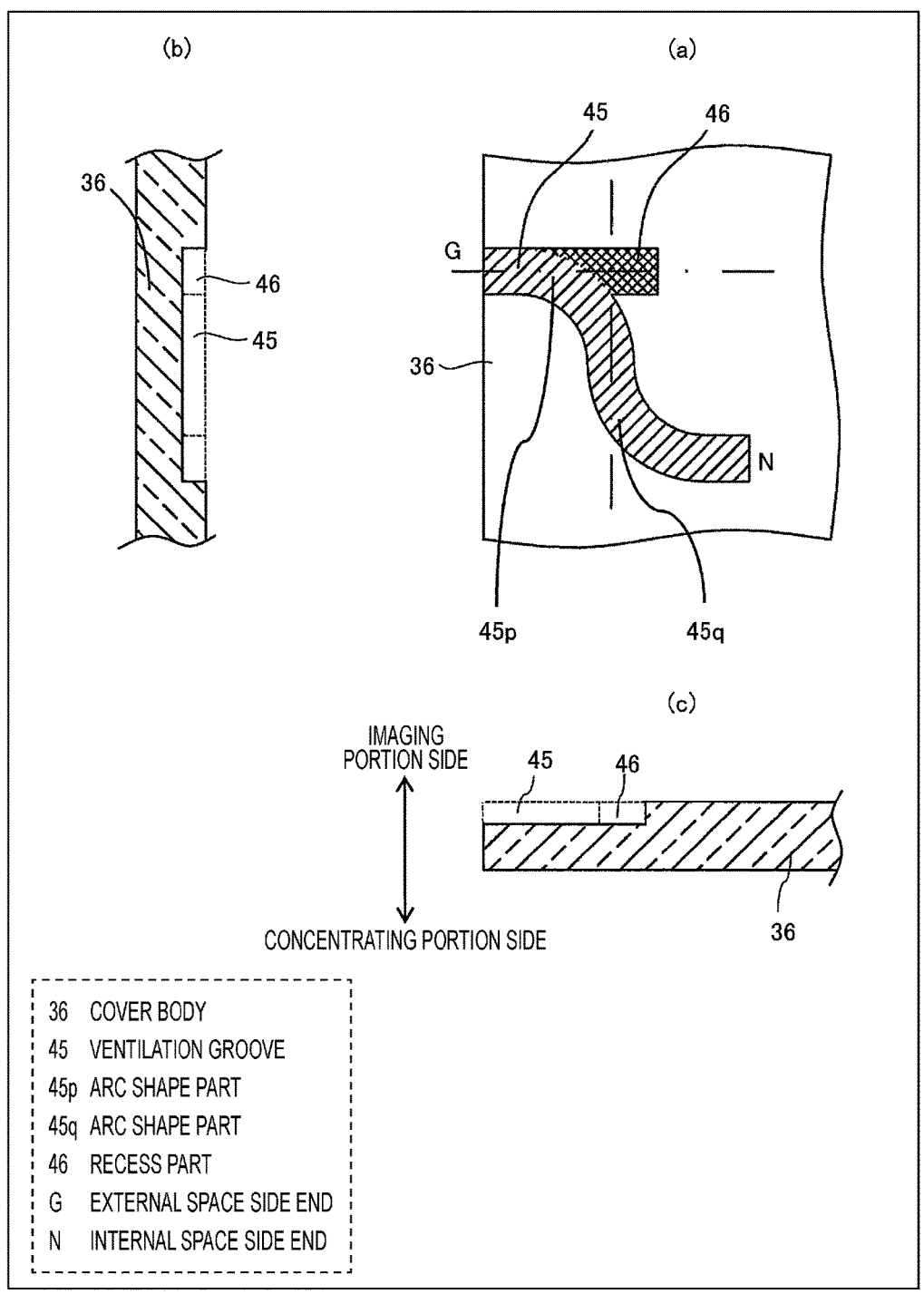
FIG. 5(*a*) is a plan view illustrating a configuration of a cover body of Embodiment 3, (*b*) is a sectional view taken along a vertical line of (*a*), and (*c*) is a sectional view taken along a horizontal line of (*a*).

FIG. 5(*a*) is a plan view illustrating a configuration of a cover body of Embodiment 3, (*b*) is a sectional view taken along a vertical line of (*a*), and (*c*) is a sectional view taken along a horizontal line of (*a*). As illustrated in FIGS. 1 and 5, the ventilation groove 45 and the recess part 46 which is formed so as to branch off from the ventilation groove 45 are provided on the surface in the ceiling part of the cover body 36, which adheres to the transparent plate 38, the ventilation groove 45 has an arc shape part 45*p*, and the recess part 46 communicates with an outer periphery of the arc shape part 45*p*.

In Embodiment 3, a foreign matter which has intruded from the external side end G of the ventilation groove 45 is easily trapped by the recess part 46 with a centrifugal force, and it is difficult for the foreign matter which has been trapped by the recess part 46 once to return to the ventilation groove 45 even when the top and bottom or the posture of the camera module is changed. Thus, it becomes difficult for the foreign matter to reach the internal space side end N of the ventilation groove 45.

On the other hand, a foreign matter which has intruded into the ventilation groove 45 from the internal space 43 goes over a communicating part of the ventilation groove 45, which communicates with the recess part 46, and reaches between the communicating part and the external side end G or the recess part 46. The foreign matter which has reached between the communicating part and the external side end G is discharged to the external space 44 by an air current which is generated due to expansion of a gas in the internal space 43, when the temperature of the internal space 43 rises. Moreover, when the temperature of the internal space 43 drops, the foreign matter which exists between the communicating part and the external side end G is captured by the recess part 46 by an air current generated due to shrinkage of the gas in the internal space 43. That is, since a difference is caused in a passing rate of a foreign matter according to a direction in which the foreign matter intrudes into the ventilation groove 45, it becomes possible to reduce adhesion of the foreign matter to the image sensor 39 (failure of the camera module).

The recess part 46 is caused to communicate with the arc shape part 45p on a side of the external space 44 in FIG. 5, but is not limited thereto. The recess part 46 may be caused to communicate with an outer periphery of an arc shape part 45q on a side of the internal space 43. In addition, the ventilation groove 45 is able to be formed by combining an arc shape part and a linear shape part.

Embodiment 4

Figure 6:
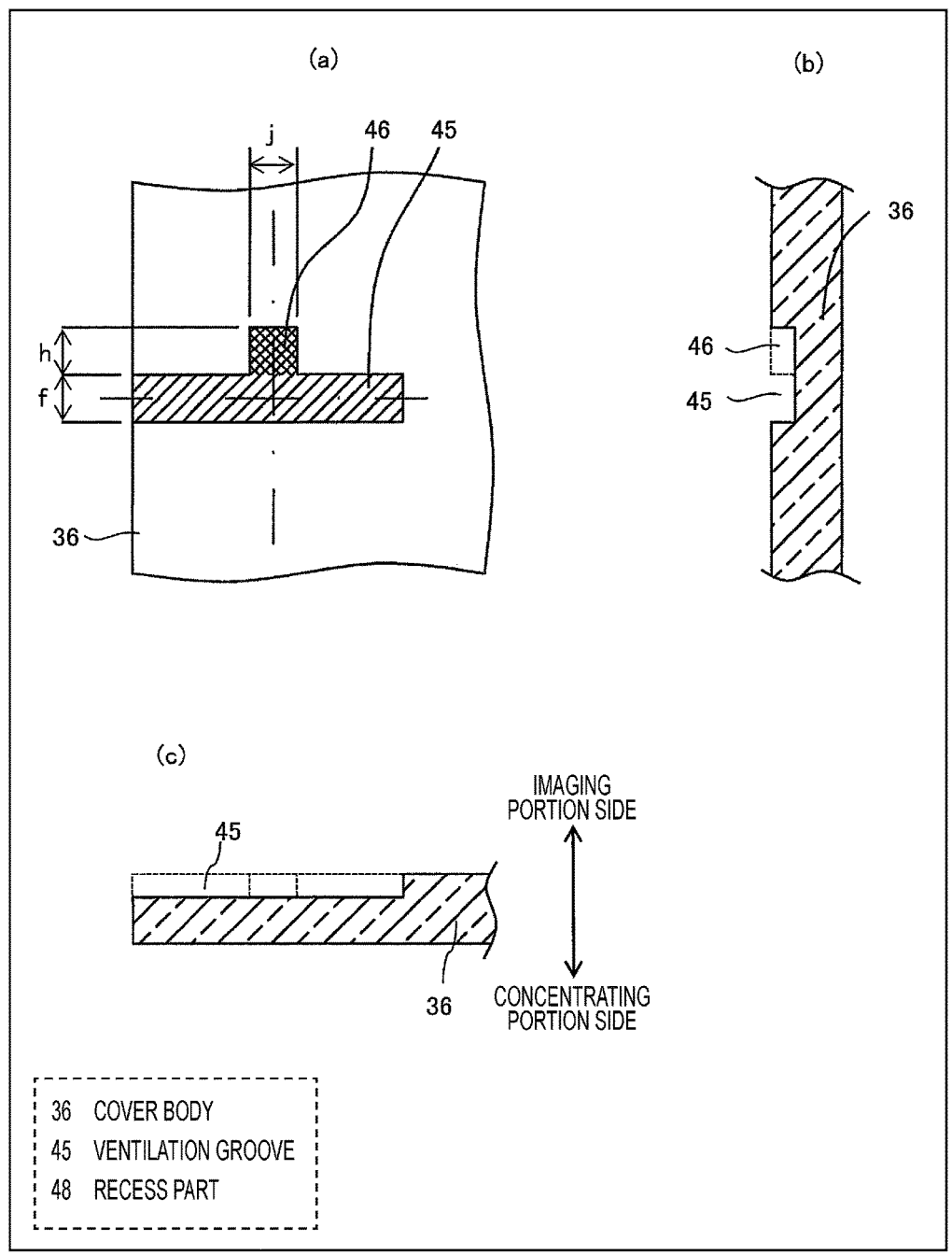
FIG. 6(*a*) is a plan view illustrating a configuration of a cover body of Embodiment 4, (*b*) is a sectional view taken along a vertical line of (*a*), and (*c*) is a sectional view taken along a horizontal line of (*a*).

FIG. 6(a) is a plan view illustrating a configuration of a cover body of Embodiment 4, (b) is a sectional view taken along a vertical line of (a), and (c) is a sectional view taken along a horizontal line of (a). As illustrated in FIGS. 1 and 6, the ventilation groove 45 and the recess part 46 which is formed so as to branch off from the ventilation groove 45 are provided on the surface in the ceiling part of the cover body 36, which adheres to the transparent plate 38.

When it is set that, a width of a communicating part of the recess part 46, which communicates with the ventilation groove 45, is j, a width of a communicating part of the ventilation groove 45, which communicates with the recess part 46, is f, and a depth (extending length) of the recess part 46 is h, in the case of j≥f, it is easy to trap a foreign matter intruding into the ventilation groove 45 by the recess part 46. In addition, in the case of h≥f, it is easy to hold the foreign matter trapped by the recess part 46 at the recess part 46. That is, the foreign matter intruding into the ventilation groove 45 easily remains at the ventilation groove 45 and the recess part 46, so that it is possible to reduce foreign matters reaching the internal space 43 from the ventilation groove 45 and reduce a rate of failure of the camera module.

Embodiment 5

Figure 7:
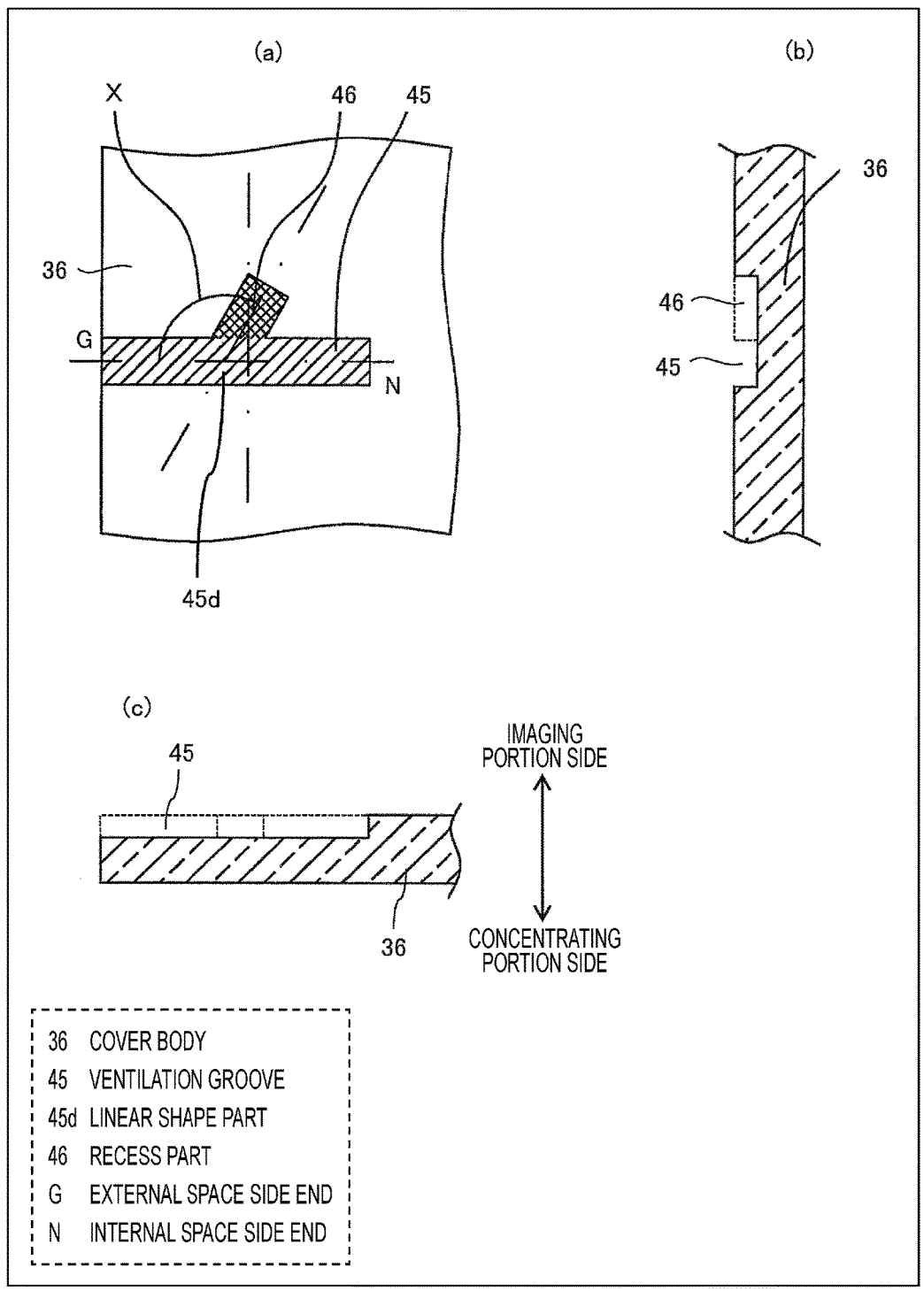
FIG. 7(*a*) is a plan view illustrating a configuration of a cover body of Embodiment 5, (*b*) is a sectional view taken along a vertical line of (*a*), and (*c*) is a sectional view taken along a horizontal line of (*a*).

FIG. 7(a) is a plan view illustrating a configuration of a cover body of Embodiment 5, (b) is a sectional view taken along a vertical line of (a), and (c) is a sectional view taken along a horizontal line of (a). As illustrated in FIGS. 1 and 7, the ventilation groove 45 and the recess part 46 which is formed so as to branch off from the ventilation groove 45 are provided on the surface in the ceiling part of the cover body 36, which adheres to the transparent plate 38, the ventilation groove 45 has a linear shape part 45d, the recess part 46 communicates with the linear shape part 45d, and an angle X formed by a depth direction of the recess part 46 and a direction going to the external side end G from a communicating part of the linear shape part 45d, which communicates with the recess part 46, is an obtuse angle.

In Embodiment 5, since the angle X is the obtuse angle, a foreign matter which has intruded from the external side end G of the ventilation groove 45 is easily trapped by the recess part 46, and it is difficult for the foreign matter which has been trapped by the recess part 46 once to return to the ventilation groove 45 even when the top and bottom or the posture of the camera module is changed. Thus, it becomes difficult for the foreign matter to reach the internal space side end N of the ventilation groove 45. Note that, X only needs to satisfy 90°≤X<180°.

On the other hand, a foreign matter which has intruded into the ventilation groove 45 from the internal space 43 goes over the communicating part of the ventilation groove 45, which communicates with the recess part 46, and reaches between the communicating part and the external side end G or the recess part 46. The foreign matter which has reached between the communicating part and the external side end G is discharged to the external space 44 by an air current which is generated due to expansion of a gas in the internal space 43, when the temperature of the internal space 43 rises. Moreover, when the temperature of the internal space 43 drops, the foreign matter which exists between the communicating part and the external side end G is captured by the recess part 46 by an air current generated due to shrinkage of the gas in the internal space 43. That is, a difference is caused in a passing rate of a foreign matter according to a direction in which the foreign matter intrudes into the ventilation groove 45, so that it is possible to reduce foreign matters reaching the internal space 43 and reduce a rate of failure of the camera module.

Note that, as FIG. 7, the recess part 46 may be provided between the external side end G and the curved part 45w in FIG. 4 (instead of the recess part 46 of FIG. 4 or in addition to the recess part 46 of FIG. 4). Similarly, as FIG. 7, the recess part 46 may be provided in the arc shape part 45p in FIG. 5 (instead of the recess part 46 of FIG. 5 or in addition to the recess part 46 of FIG. 5). In addition, a part of the ventilation groove 45 other than the linear shape part 45d may have a linear shape, a curved shape, or an arc shape.

Embodiment 6

Figure 8:
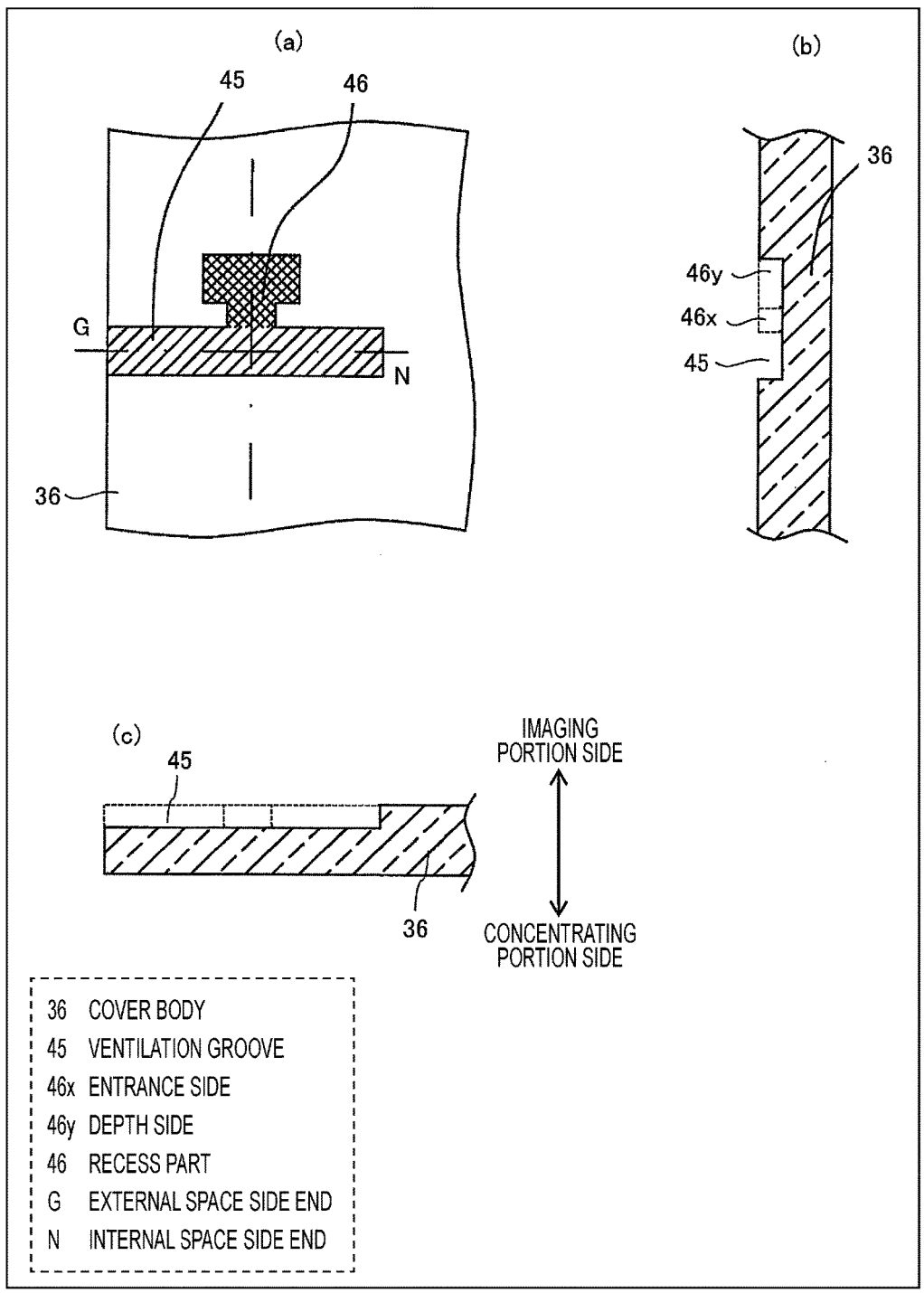
FIG. 8(*a*) is a plan view illustrating a configuration of a cover body of Embodiment 6, (*b*) is a sectional view taken along a vertical line of (*a*), and (*c*) is a sectional view taken along a horizontal line of (*a*).

FIG. 8(a) is a plan view illustrating a configuration of a cover body of Embodiment 6, (b) is a sectional view taken along a vertical line of (a), and (c) is a sectional view taken along a horizontal line of (a). As illustrated in FIGS. 1 and 8, the ventilation groove 45 and the recess part 46 which is formed so as to branch off from the ventilation groove 45 are provided on the surface in the ceiling part of the cover body 36, which adheres to the transparent plate 38, and the recess part 46 has a drawstring pouch shape in which a width of a depth side 46y is wider than a width of an entrance side 46x which is a communicating part which communicates with the ventilation groove 45.

In Embodiment 6, a foreign matter which has intruded into the ventilation groove 45 is captured by the recess part 46, and since the recess part 46 has the drawstring pouch shape, it is difficult for the foreign matter which has been captured by the recess part 46 once to return to the ventilation groove 45. Thereby, it is possible to reduce foreign matters reaching the internal space 43 and reduce a rate of failure of the camera module.

Embodiment 7

Figure 9:
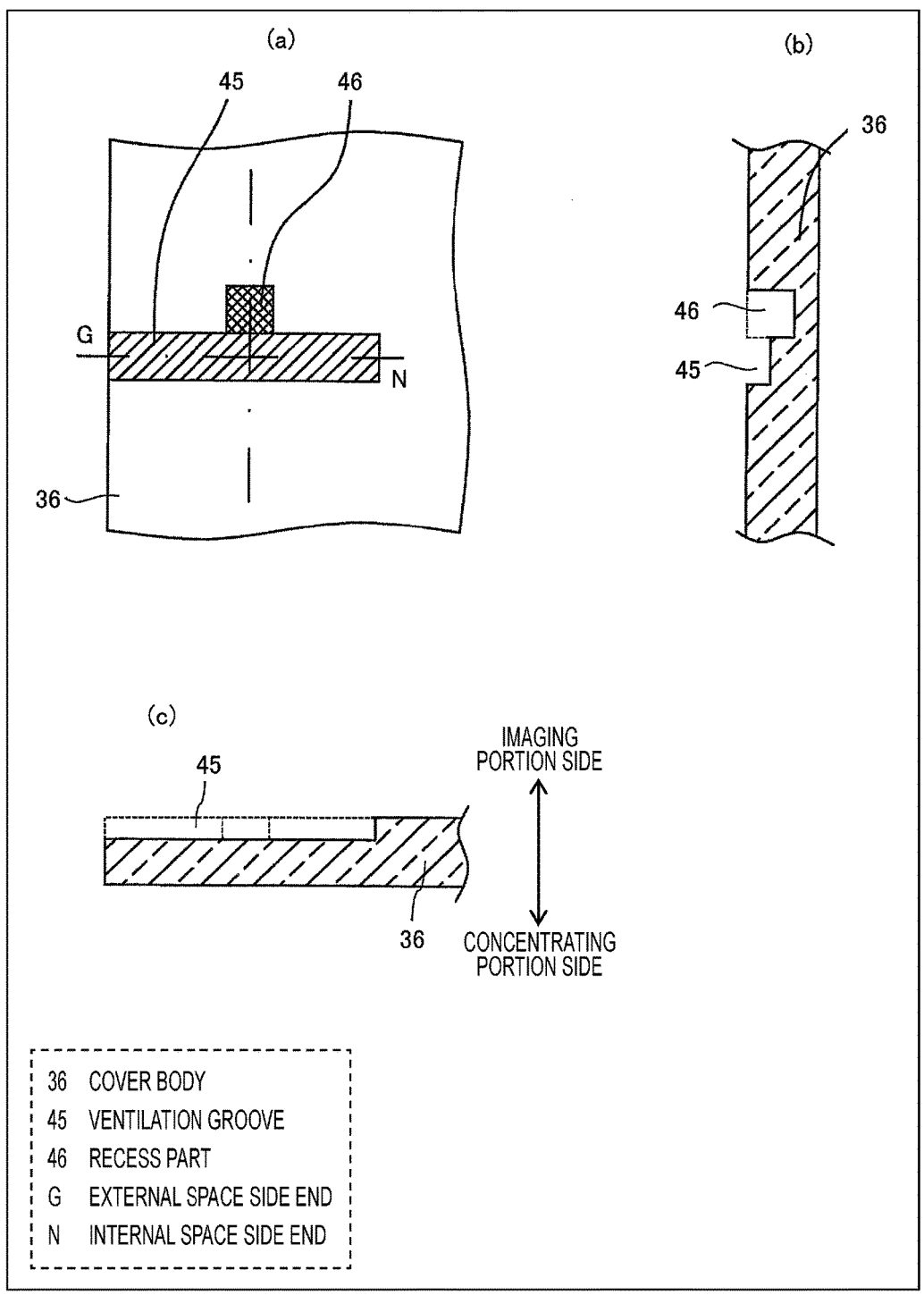
FIG. 9(*a*) is a plan view illustrating a configuration of a cover body of Embodiment 7, (*b*) is a sectional view taken along a vertical line of (*a*), and (*c*) is a sectional view taken along a horizontal line of (*a*).

FIG. 9(a) is a plan view illustrating a configuration of a cover body of Embodiment 7, (b) is a sectional view taken along a vertical line of (a), and (c) is a sectional view taken along a horizontal line of (a). As illustrated in FIGS. 1 and 9, the ventilation groove 45 and the recess part 46 which is formed so as to branch off from the ventilation groove 45 are provided on the surface in the ceiling part of the cover body 36, which adheres to the transparent plate 38, and a depth of the recess part 46 is greater than a depth of the ventilation groove 45.

In Embodiment 7, a foreign matter which has intruded into the ventilation groove 45 is captured by the recess part 46, and since the recess part 46 has a jar shape, it is difficult for the foreign matter which has been captured by the recess part 46 once to return to the ventilation groove 45. Thereby, it is possible to reduce foreign matters reaching the internal space 43 and reduce a rate of failure of the camera module.

Embodiment 8

Figure 10:
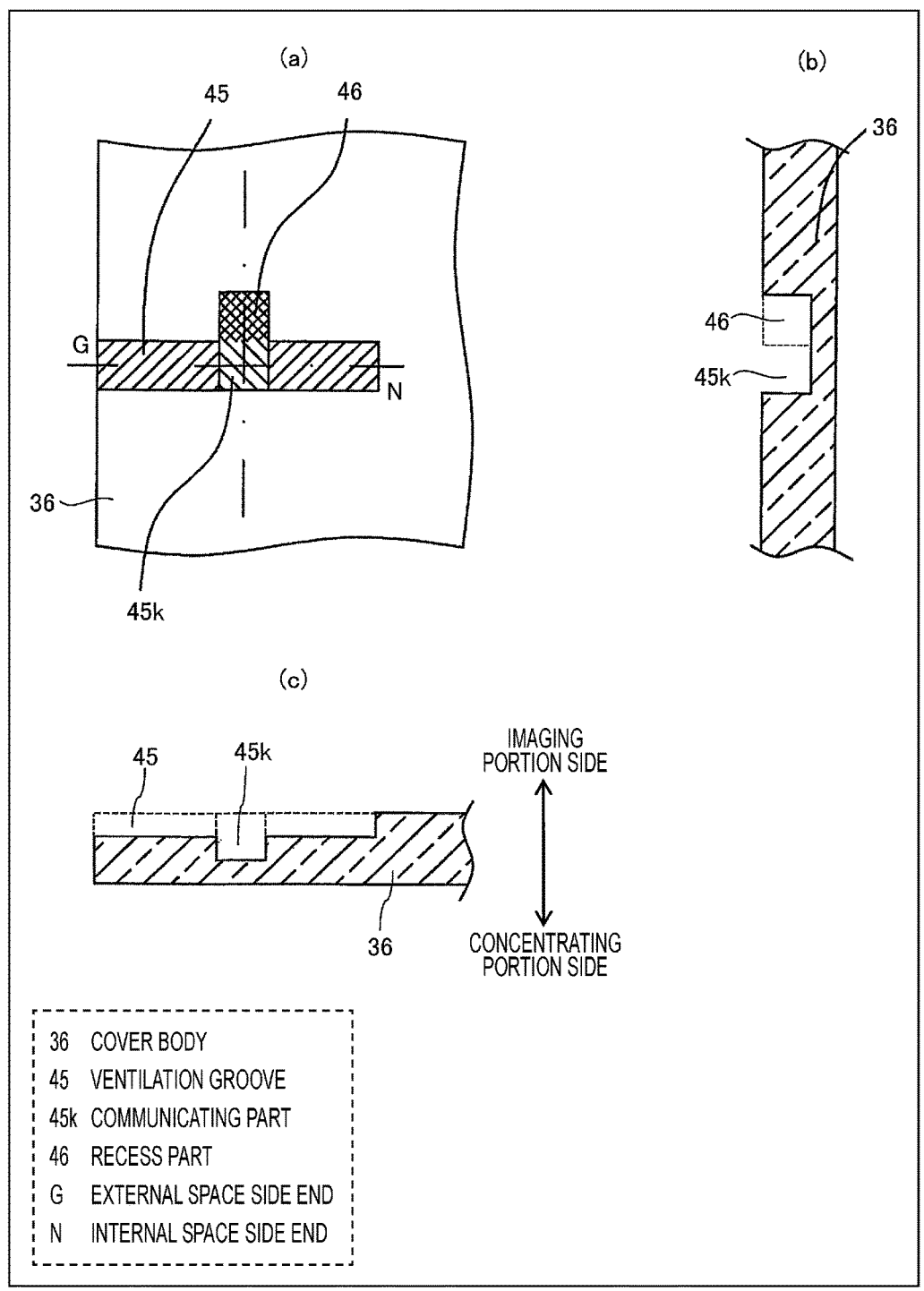
FIG. 10(*a*) is a plan view illustrating a configuration of a cover body of Embodiment 8, (*b*) is a sectional view taken along a vertical line of (*a*), and (*c*) is a sectional view taken along a horizontal line of (*a*).

FIG. 10(a) is a plan view illustrating a configuration of a cover body of Embodiment 8, (b) is a sectional view taken along a vertical line of (a), and (c) is a sectional view taken along a horizontal line of (a). As illustrated in FIGS. 1 and 10, the ventilation groove 45 and the recess part 46 which is formed so as to branch off from the ventilation groove 45 are provided on the surface in the ceiling part of the cover body 36, which adheres to the transparent plate 38, the ventilation groove 45 has a communicating part 45k which communicates with the recess part 46 and is deeper than the other parts, and a depth of the recess part 46 is the same as a depth of the communicating part 45k of the ventilation groove 45, which communicates with the recess part 46.

In Embodiment 8, a foreign matter which has intruded into the ventilation groove 45 is captured by the recess part 46, and since the communicating part 45k of the ventilation groove 45, which communicates with the recess part 46, has a jar shape, it is difficult for the foreign matter which has been captured by the recess part 46 once to return to the ventilation groove 45. Thereby, it is possible to reduce foreign matters reaching the internal space 43 and reduce a rate of failure of the camera module.

Embodiment 9

Figure 11:
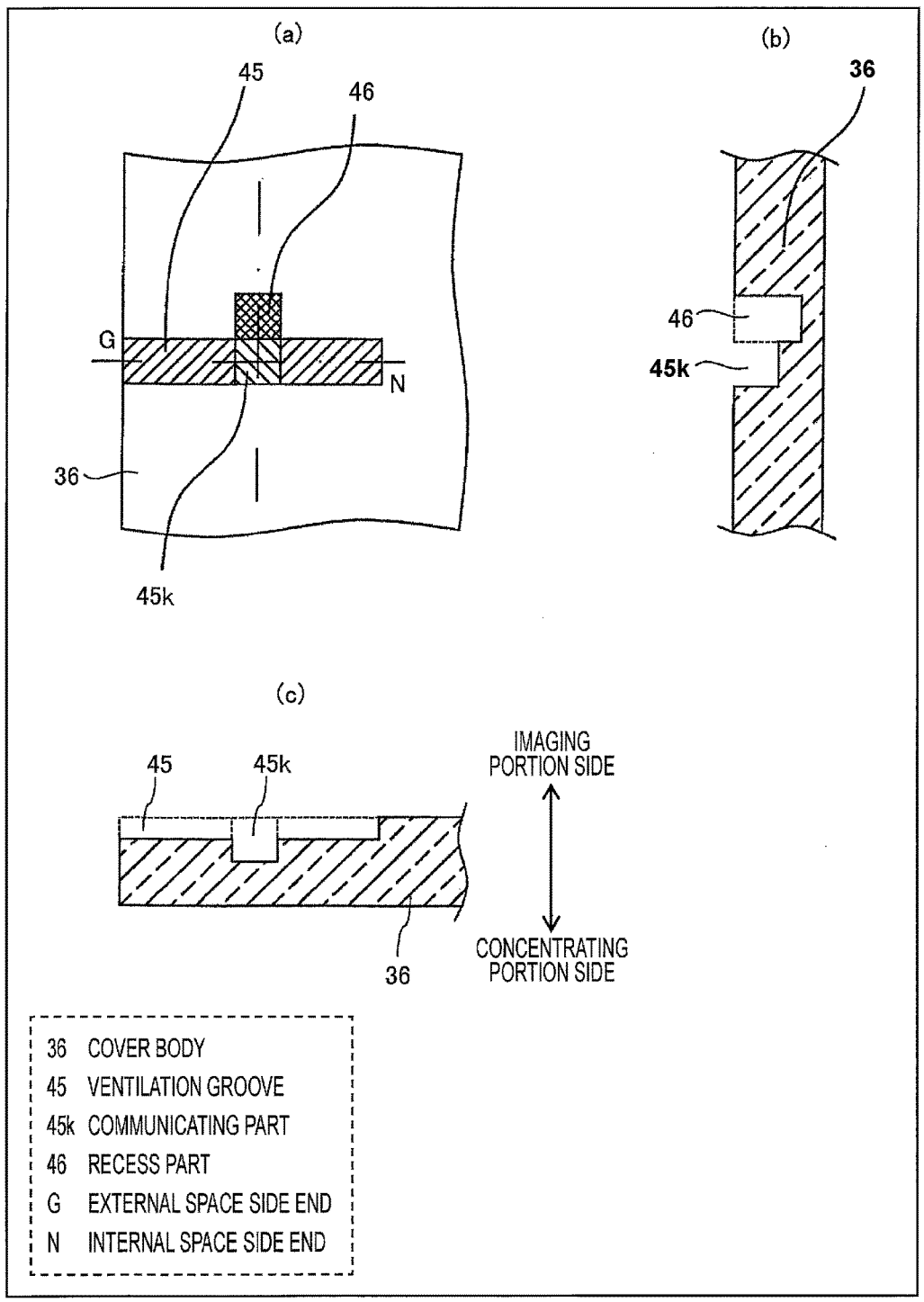
FIG. 11(*a*) is a plan view illustrating a configuration of a cover body of Embodiment 9, (*b*) is a sectional view taken along a vertical line of (*a*), and (*c*) is a sectional view taken along a horizontal line of (*a*).

FIG. 11(a) is a plan view illustrating a configuration of a cover body of Embodiment 9, (b) is a sectional view taken along a vertical line of (a), and (c) is a sectional view taken along a horizontal line of (a). As illustrated in FIGS. 1 and 11, the ventilation groove 45 and the recess part 46 which is formed so as to branch off from the ventilation groove 45 are provided on the surface in the ceiling part of the cover body 36, which adheres to the transparent plate 38, the ventilation groove 45 has the communicating part 45k which communicates with the recess part 46 and is deeper than the other parts, and the depth of the recess part 46 is greater than the depth of the communicating part 45k of the ventilation groove 45, which communicates with the recess part 46.

In Embodiment 9, a foreign matter which has intruded into the ventilation groove 45 is captured by the recess part 46, and since the recess part 46 is deeper than the communicating part 45k, it is difficult for the foreign matter which has been captured by the recess part 46 once to return to the communicating part 45k. Even if the foreign matter returns to the communicating part 45k, it is difficult to return to the ventilation groove 45 since the communicating part 45k has the jar shape. Thereby, it is possible to reduce foreign matters reaching the internal space 43 and reduce a rate of failure of the camera module.

Embodiment 10

Figure 12:
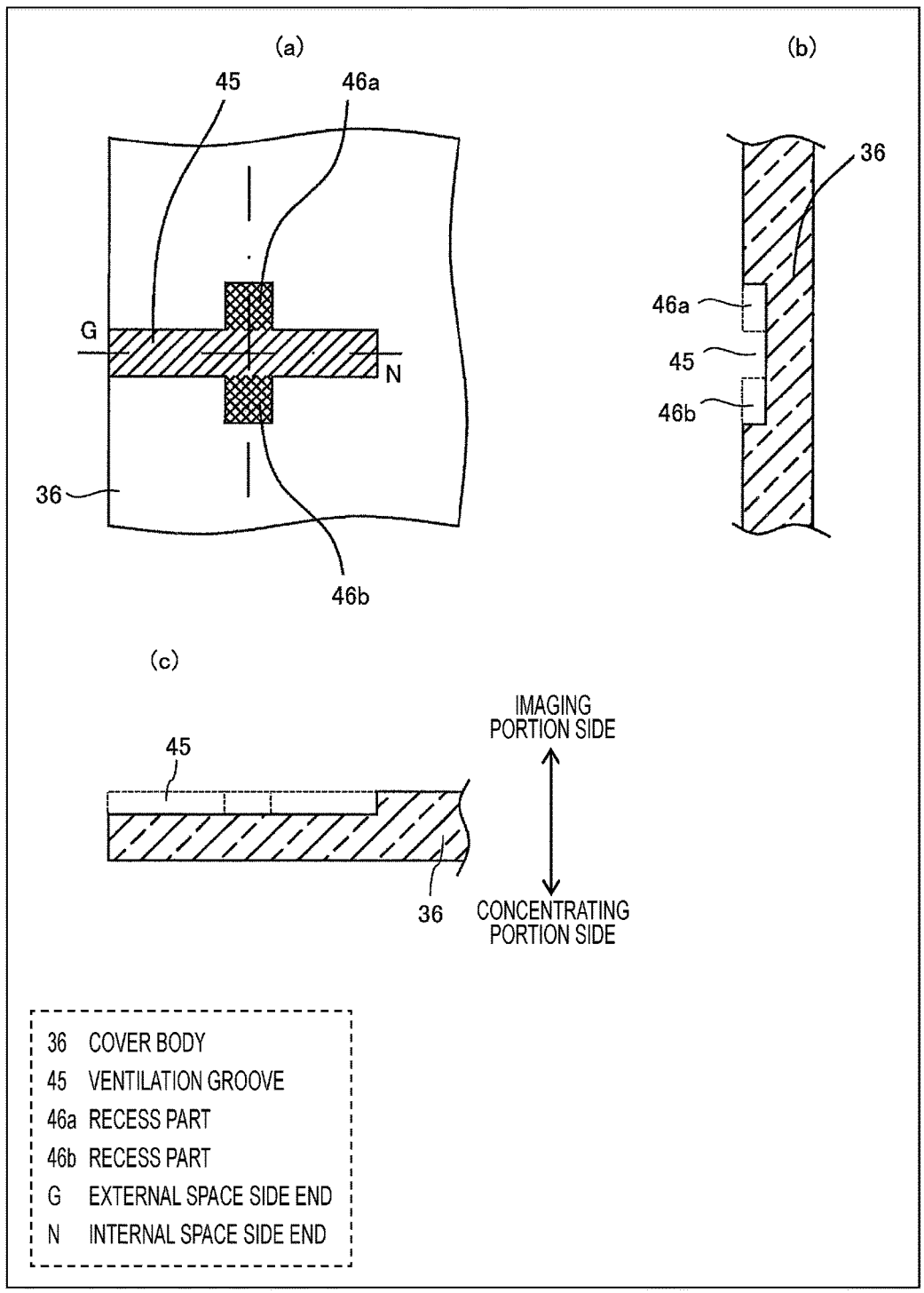
FIG. 12(*a*) is a plan view illustrating a configuration of a cover body of Embodiment 10, (*b*) is a sectional view taken along a vertical line of (*a*), and (*c*) is a sectional view taken along a horizontal line of (*a*).

FIG. 12(a) is a plan view illustrating a configuration of a cover body of Embodiment 10, (b) is a sectional view taken along a vertical line of (a), and (c) is a sectional view taken along a horizontal line of (a). As illustrated in FIGS. 1 and 12, the ventilation groove 45 and a plurality of recess parts 46a and 46b which are formed so as to branch off from the ventilation groove 45 are provided on the surface in the ceiling part of the cover body 36, which adheres to the transparent plate 38. The recess parts 46a and 46b are arranged so as to face each other with the ventilation groove 45 held therebetween.

In Embodiment 10, since it is possible to capture a foreign matter which has intruded into the ventilation groove 45 by the two recess parts 46a and 46b, a rate of capture is improved, and it is difficult for the captured foreign matter to return to the ventilation groove 45. That is, it is possible to reduce foreign matters reaching the internal space 43 and reduce a rate of failure of the camera module.

Figure 13:
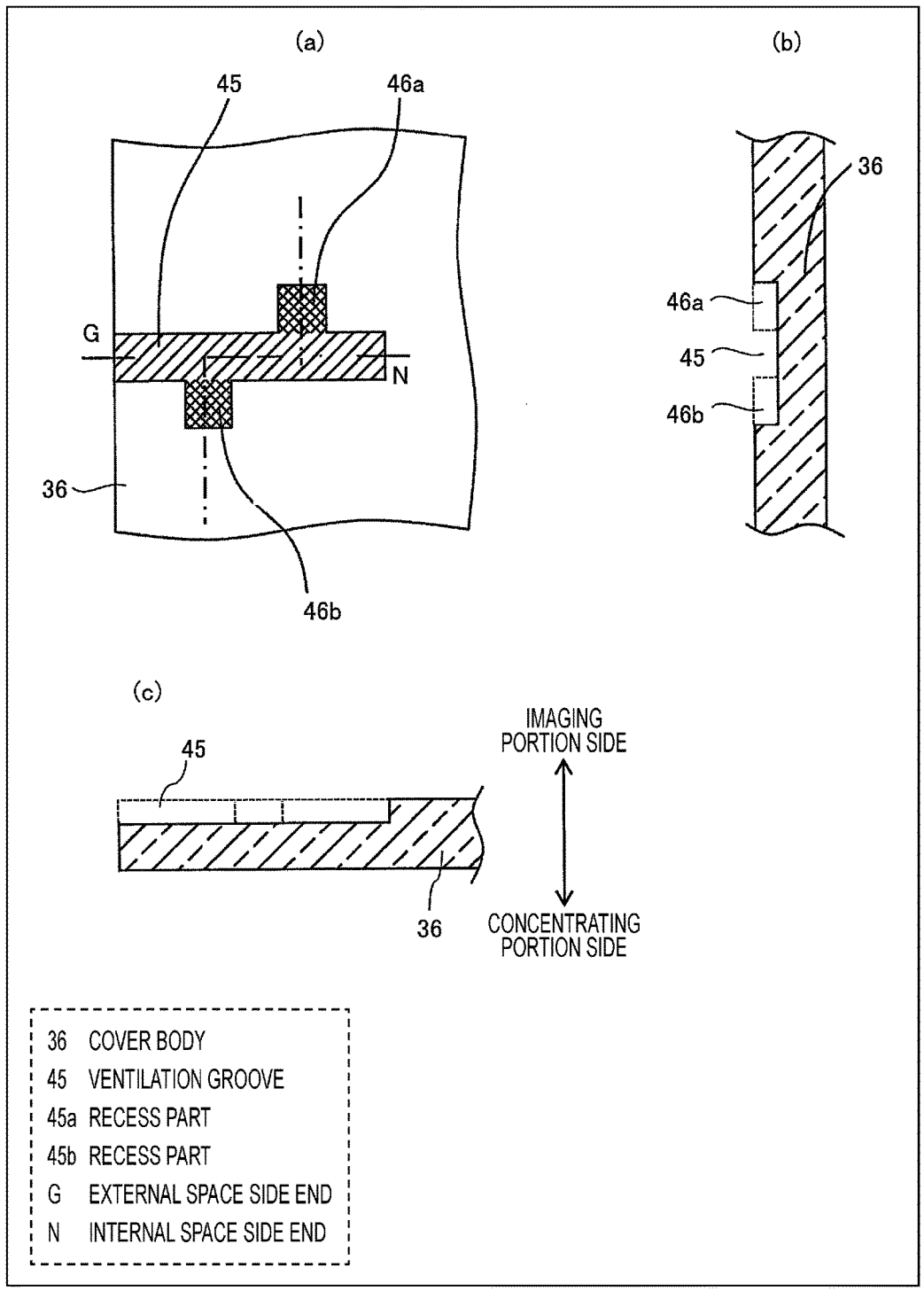
FIG. 13(*a*) is a plan view illustrating another configuration of the cover body of Embodiment 10, (*b*) is a sectional view taken along a vertical line of (*a*), and (*c*) is a sectional view taken along a horizontal line of (*a*).

Note that, in Embodiment 10, the recess parts 46a and 46b may be arranged so as to diagonally across from each other with the ventilation groove 45 held therebetween as illustrated in FIG. 13. Further, the plurality of recess parts 46 may be arranged next to each other on one side of the ventilation groove 45.

Note that, the ventilation groove 45 is not limited to have a linear shape, and may have a curved shape or an arc shape.

Embodiment 11

Figure 14:
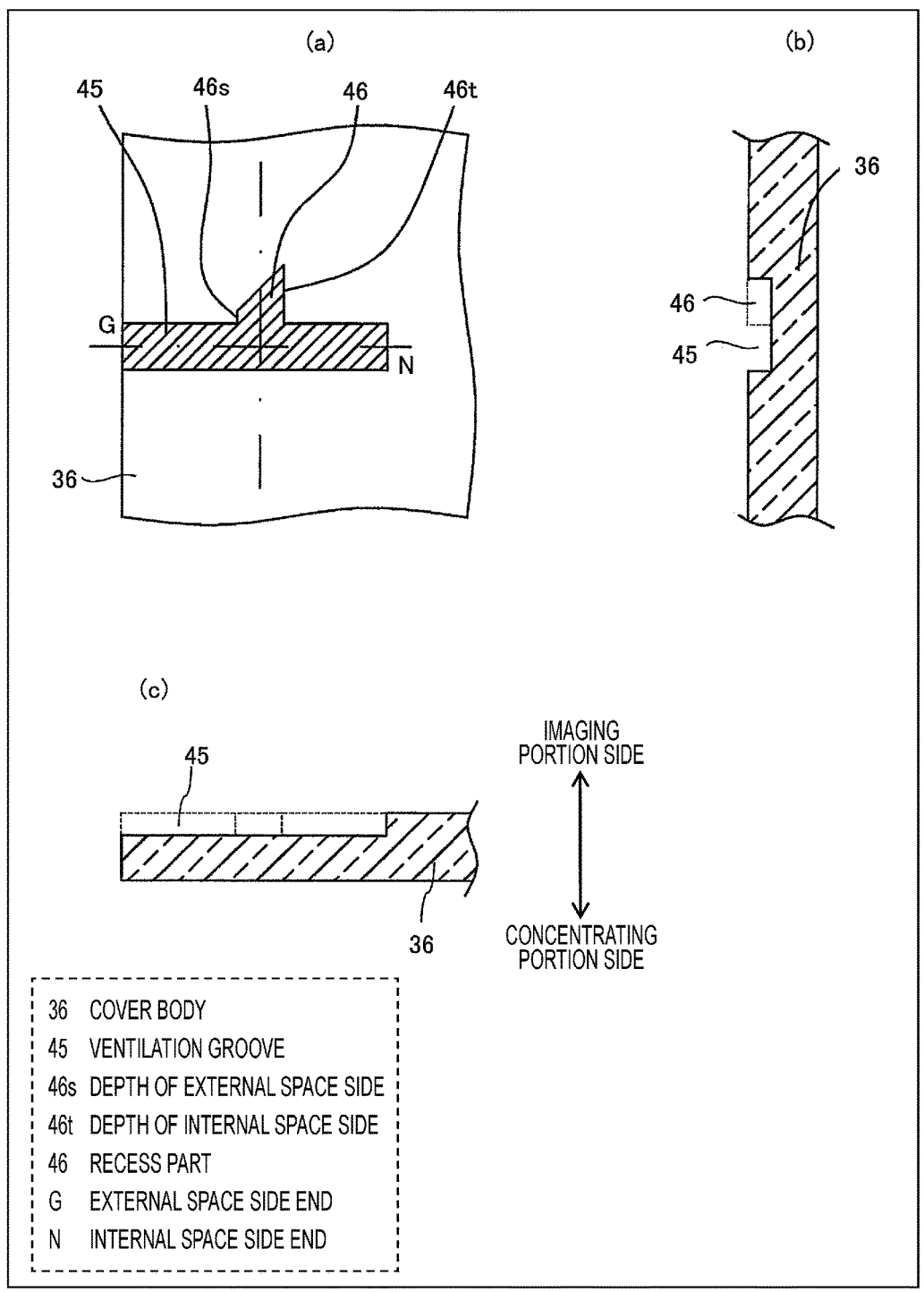
FIG. 14(*a*) is a plan view illustrating a configuration of a cover body of Embodiment 11, (*b*) is a sectional view taken along a vertical line of (*a*), and (*c*) is a sectional view taken along a horizontal line of (*a*).
Figure 15:
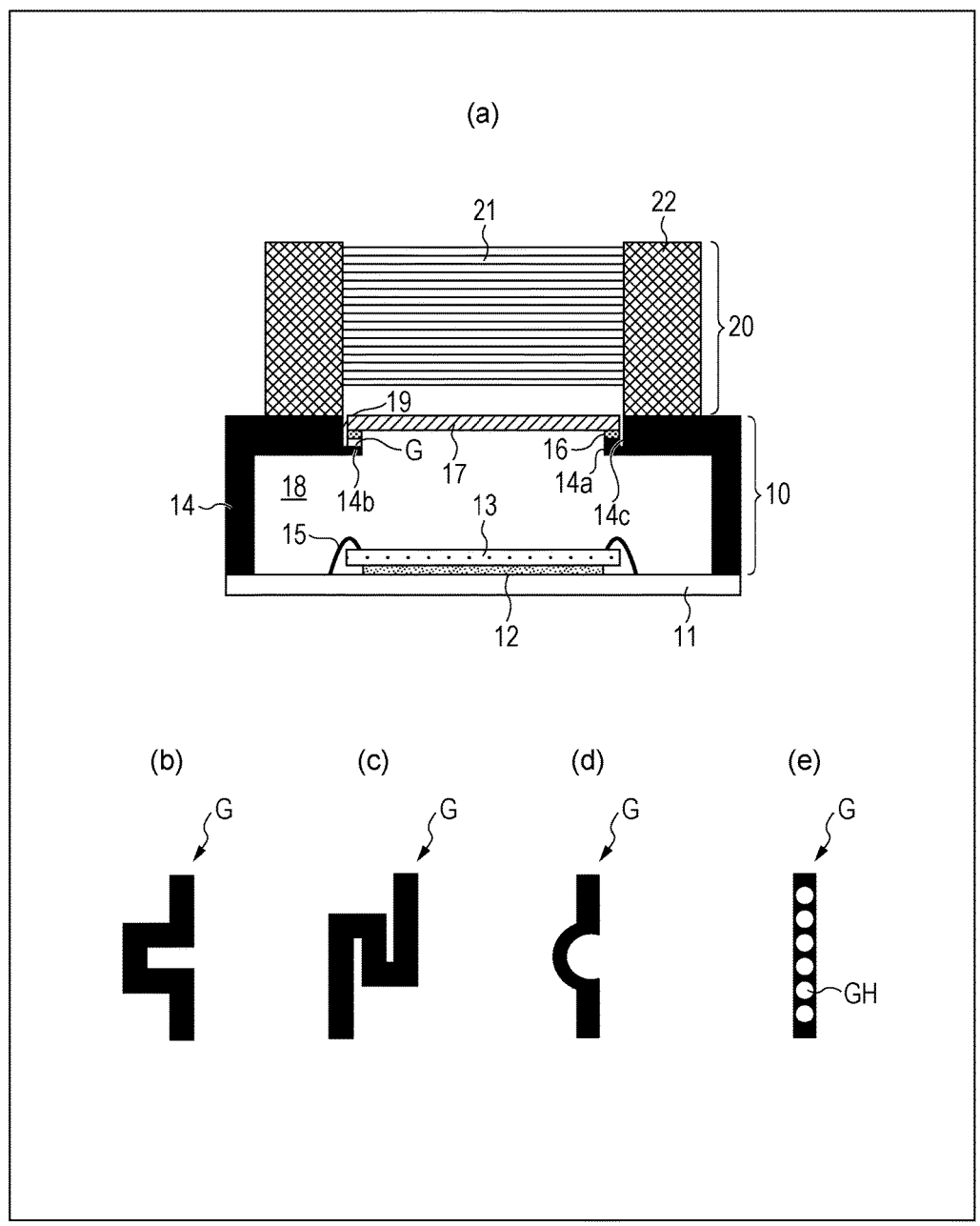
FIG. 15(*a*) is a sectional view schematically illustrating a configuration of a conventional camera module, and (*b*) to (*e*) are schematic plan views each illustrating a configuration of a ventilation groove.

FIG. 14(a) is a plan view illustrating a configuration of a cover body of Embodiment 11, (b) is a sectional view taken along a vertical line of (a), and (c) is a sectional view taken along a horizontal line of (a). As illustrated in FIGS. 1 and 14, the ventilation groove 45 and the recess part 46 which is formed so as to branch off from the ventilation groove 45 are provided on the surface in the ceiling part of the cover body 36, which adheres to the transparent plate 38, and the recess part 46 has a shape in which a depth 46s on a side of the external space 44 is less than a depth 46t on a side of the internal space 43.

In Embodiment 11, it is configured so that a foreign matter which has intruded into the external side end G of the ventilation groove 45 is easily captured by the recess part 46 and a foreign matter which has intruded into the internal part side end (internal space side end) N of the ventilation groove 45 is easily made to return (easily passes) to the external side end G of the ventilation groove 45. That is, it is possible to reduce foreign matters reaching the internal space 43 and reduce a rate of failure of the camera module. Note that, in the recess part 46, the depth 46s on the side of the external space 44 may be set as zero (a plane shape of the recess part 46 may be set to be a triangle).

The invention is not limited to each of the embodiments described above, and an embodiment achieved by appropriately combining configurations disclosed in each of different embodiments is also encompassed in the technical scope of the invention. For example, combinations of the configurations of FIG. 4, FIG. 9, and FIG. 12 are also allowed, and it is also possible to further combine the combinations with the configuration of FIG. 8. In addition, an embodiment achieved by combining Embodiment 2 (FIG. 4), Embodiment 4 (FIG. 6), Embodiment 6 (FIG. 8), Embodiment 7 (FIG. 9), Embodiment 8 (FIG. 10), Embodiment 10 (FIGS. 12 and 13), and Embodiment 11 (FIG. 14) is allowed, as well.

[Overview]

The present camera module is a camera module which includes a wiring substrate, an image sensor mounted on the wiring substrate, a cover body covering the image sensor, a transparent plate adhering to the cover body so as to overlap with an aperture of the cover body which is formed above the image sensor, and an imaging lens provided above the transparent plate, and in which an internal space is formed by the wiring substrate, the cover body, and the transparent plate, in which a ventilation groove which extends from the internal space to an outside of the internal space and a recess part which is formed so as to branch off from the ventilation groove are provided on a surface of the cover body, which adheres to the transparent plate.

The present camera module may have a configuration in which the ventilation groove has a curved part, and the recess part communicates with the curved part in such a manner that a path from an external side of the ventilation groove to the curved part is extended.

The present camera module may have a configuration in which the ventilation groove has an arc shape part, and the recess part communicates with an outer periphery of the arc shape part. This configuration may be configured so that a direction of a depth of the recess part has an angle which is not less than 90 degrees and less than 180 degrees with respect to a direction among directions of a tangent line at the center of a communicating part of the arc shape part and the recess part, which is closer to the outside with the center of the communicating part as a reference.

The present camera module may have a configuration in which at least one of a width of a communicating part of the recess part, which communicates with the ventilation groove, and a depth of the recess part is greater than a width of a communicating part of the ventilation groove, which communicates with the recess part.

The present camera module may have a configuration in which the ventilation groove has a linear shape part, the recess part communicates with the linear shape part, and a direction of a depth of the recess part has an angle which is not less than 90 degrees and less than 180 degrees with respect to a direction which goes to a side of the outside from a communicating part of the linear shape part, which communicates with the recess part.

The present camera module may have a configuration in which, in the recess part, a width of a depth side is wider than a width of an entrance side which is a communicating part which communicates with the ventilation groove.

The present camera module may have a configuration in which a depth of the recess part is greater than a depth of the ventilation groove.

The present camera module may have a configuration in which the ventilation groove has a communicating part which communicates with the recess part and is deeper than the other parts, and a depth of the recess part is the same as a depth of the communicating part of the ventilation groove, which communicates with the recess part.

The present camera module may have a configuration in which the ventilation groove has the communicating part which communicates with the recess part and is deeper than the other parts, and the depth of the recess part is greater than the depth of the communicating part of the ventilation groove, which communicates with the recess part.

The present camera module may have a configuration in which a plurality of the recess parts are formed.

The present camera module may have a configuration in which the recess part has a shape in which a depth on a side of the outside is less than a depth on a side of the internal space.

INDUSTRIAL APPLICABILITY

The invention is able to be applied to a camera module which performs imaging in, for example, a cellular phone with a camera, a digital camera, a security camera, a television camera, or the like.

REFERENCE SIGNS LIST 30 camera module
32 concentrating portion
33 lens unit
34 lens holder
35 imaging portion
36 cover body
37 adhesive
38 transparent plate
39 image sensor
41 wiring substrate
43 internal space
44 external space
45 ventilation groove
45w curved part
45p arc shape part
45k communicating part (of ventilation groove) which communicates with recess part
46 recess part
46a, 46b a plurality of recess parts
G external space side end (of ventilation groove)
N internal space side end (of ventilation groove)
LS imaging lens

The invention claimed is:
1. A camera module comprising:
a wiring substrate;
an image sensor mounted on the wiring substrate;
a cover body covering the image sensor;
a transparent plate adhering to the cover body so as to overlap with an aperture of the cover body which is above the image sensor; and
an imaging lens provided above the transparent plate, in which an internal space is defined by the wiring substrate, the cover body, and the transparent plate, wherein
a ventilation groove which extends from the internal space to an outside of the internal space and a recess portion which branches off from the ventilation groove are on a surface of the cover body, which adheres to the transparent plate,
the ventilation groove includes a curved portion,
the recess portion communicates with the curved portion in such a manner that a linear path from an end of an external side of the ventilation groove to the curved portion is extended, and
a depth of the recess portion is greater than a depth of the ventilation groove.
2. The camera module according to claim 1, wherein at least one of a width of a communicating portion of the recess portion, which communicates with the ventilation groove, and a depth of the recess portion is greater than a width of a communicating portion of the ventilation groove, which communicates with the recess portion.
3. The camera module according to claim 1, wherein, in the recess portion, a width of a depth side is wider than a width of an entrance side which is a communicating portion which communicates with the ventilation groove.
4. A camera module comprising:
a wiring substrate;
an image sensor mounted on the wiring substrate;
a cover body covering the image sensor;

a transparent plate adhering to the cover body so as to overlap with an aperture of the cover body which is above the image sensor; and an imaging lens provided above the transparent plate, in which an internal space is defined by the wiring substrate, the cover body, and the transparent plate, wherein a ventilation groove which extends from the internal space to an outside of the internal space and a recess portion which branches off from the ventilation groove are on a surface of the cover body, which adheres to the transparent plate, the ventilation groove includes a curved portion, the recess portion communicates with the curved portion in such a manner that a linear path from an end of an external side of the ventilation groove to the curved portion is extended, the ventilation groove includes a communicating portion which communicates with the recess portion and is deeper than other portions, and a depth of the recess portion is the same as a depth of the communicating portion of the ventilation groove, which communicates with the recess portion.

5. The camera module according to claim 4, wherein at least one of a width of a communicating portion of the recess portion, which communicates with the ventilation groove, and the depth of the recess portion is greater than a width of the communicating portion of the ventilation groove, which communicates with the recess portion.

6. The camera module according to claim 4, wherein, in the recess portion, a width of a depth side is wider than a width of an entrance side which is a communicating portion which communicates with the ventilation groove.

7. A camera module comprising:
a wiring substrate;
an image sensor mounted on the wiring substrate;
a cover body covering the image sensor;
a transparent plate adhering to the cover body so as to overlap with an aperture of the cover body which is above the image sensor; and an imaging lens provided above the transparent plate, in which an internal space is defined by the wiring substrate, the cover body, and the transparent plate, wherein a ventilation groove which extends from the internal space to an outside of the internal space and a recess portion which branches off from the ventilation groove are on a surface of the cover body, which adheres to the transparent plate, the ventilation groove includes a curved portion, the recess portion communicates with the curved portion in such a manner that a linear path from an end of an external side of the ventilation groove to the curved portion is extended, the ventilation groove includes a communicating portion which communicates with the recess portion and is deeper than other portions, and a depth of the recess portion is greater than a depth of the communicating portion of the ventilation groove, which communicates with the recess portion.

8. The camera module according to claim 5, wherein at least one of a width of a communicating portion of the recess portion, which communicates with the ventilation groove, and the depth of the recess portion is greater than a width of the communicating portion of the ventilation groove, which communicates with the recess portion.

9. The camera module according to claim 5, wherein, in the recess portion, a width of a depth side is wider than a width of an entrance side which is a communicating portion which communicates with the ventilation groove.

* * * * *